SEMICONDUCTOR MEMORY ELEMENT AND METHOD

Filed Sept. 1, 1966 2 Sheets-Sheet 1

INVENTOR.
THOMAS E. EVERHART
NOEL C. MacDONALD
BY [signature]
ATTORNEYS

Sept. 8, 1970 T. E. EVERHART ET AL 3,528,064

SEMICONDUCTOR MEMORY ELEMENT AND METHOD

Filed Sept. 1, 1966 2 Sheets-Sheet 2

INVENTOR.
THOMAS E. EVERHART
BY NOEL C. MacDONALD

Flehr and Swain

ATTORNEYS

United States Patent Office 3,528,064
Patented Sept. 8, 1970

3,528,064

SEMICONDUCTOR MEMORY ELEMENT AND METHOD

Thomas E. Everhart, Berkeley, and Noel C. MacDonald, Albany, Calif., assignors to The Regents of the University of California Filed Sept. 1, 1966, Ser. No. 576,669
Int. Cl. G11c *11/42*
U.S. Cl. 340—173 15 Claims

ABSTRACT OF THE DISCLOSURE

A semiconductor storage element and method which utilizes a metal oxide semiconductor field effect type transistor and selectively stores charge in the insulating layer of the transistor by irradiating selected areas with a high energy electron beam while applying a voltage between the metal electrode and the semiconductor body which transfers charges between the metal electrode and the bombarded area of the insulating area.

This invention relates generally to a semiconductor device and method, and more particularly to a semiconductor memory element suitable for use as a memory or logic element in digital computers and the like and to a method of operation of the same. The invention described herein was made in the course of research sponsored by the United States Air Force.

Metal - oxide - semiconductor field effect transistors (MOSFET), sometimes termed insulated gate field effect transistors (IGFET), are well known in the art. Transistors of this type include a body of semiconductor material of one conductivity type having spaced source and drain terminals formed on one surface thereof. Such terminals may be in the form of regions of opposite conductivity type inset into the body and provided with ohmic connections. An oxide layer overlies the surface between the source and drain electrodes and carries a metal film which serves as the gate electrode. The oxide layer may be an applied layer, or it may be formed by suitably oxidizing the surface of the semiconductor material.

By applying a voltage of suitable polarity and magnitude between the body and the gate electrode, an inversion layer is induced in the body of material directly below the gate electrode. The inverted layer then defines or forms a channel of the same conductivity type as the source and drain regions which provides a conductive path between the regions. The depth of the channel and its conductivity is dependent upon the magnitude of the voltage applied. The current flowing between the source and drain regions can be modulated by varying the gate voltage to modulate the conductivity.

The voltage characteristics of such devices are difficult to control in manufacturing processes. Generally, it is accomplished by controlling the diffusion time, oxide thickness, spacing of electrodes and the like. However, the threshold voltage, $V_{th}$, of such devices can be controlled only over a narrow range of a few tenths of a volt.

When field effect devices are used in logic circuits, they are used as active devices which normally dissipate power in contrast to many storage devices which retain information without either power dissipation or an applied signal. Furthermore, in complex circuits multiple leads are required making for complex connection problems. This is true wheather the devices are discrete devices or are encapsulated in complex integrated or microcircuits.

It is a general object of the present invention provide a semiconductor element having predetermined controlled voltage characteristics.

It is a further object of the present invention to provide a semiconductor memory element which is simple in construction and suitable for memory and logic applications.

It is a further object of the present invention to provide an improved method of data storage and retrieval.

It is a further object of the present invention to provide a semiconductor memory element which retains information without power dissipation or an applied signal.

It is a further object of the present invention to provide a semiconductor memory element having a high data packing density.

It is still another object of the present invention to provide a semiconductor memory element which can be used for computer storage in which the read-in and read-out of information does not destroy previously stored information.

It is still a further object of the present invention to provide a semiconductor memory element having an insulating layer which permanently stores charge.

It is a further object to provide a method of controllably changing the characteristics of a semiconductor device.

The foregoing and other objects of the invention will become more clearly apparent from the following description when taken in conjunction with the accompanying drawings.

Referring to the drawings.

Figures 1, 2, 5, 6, 7:
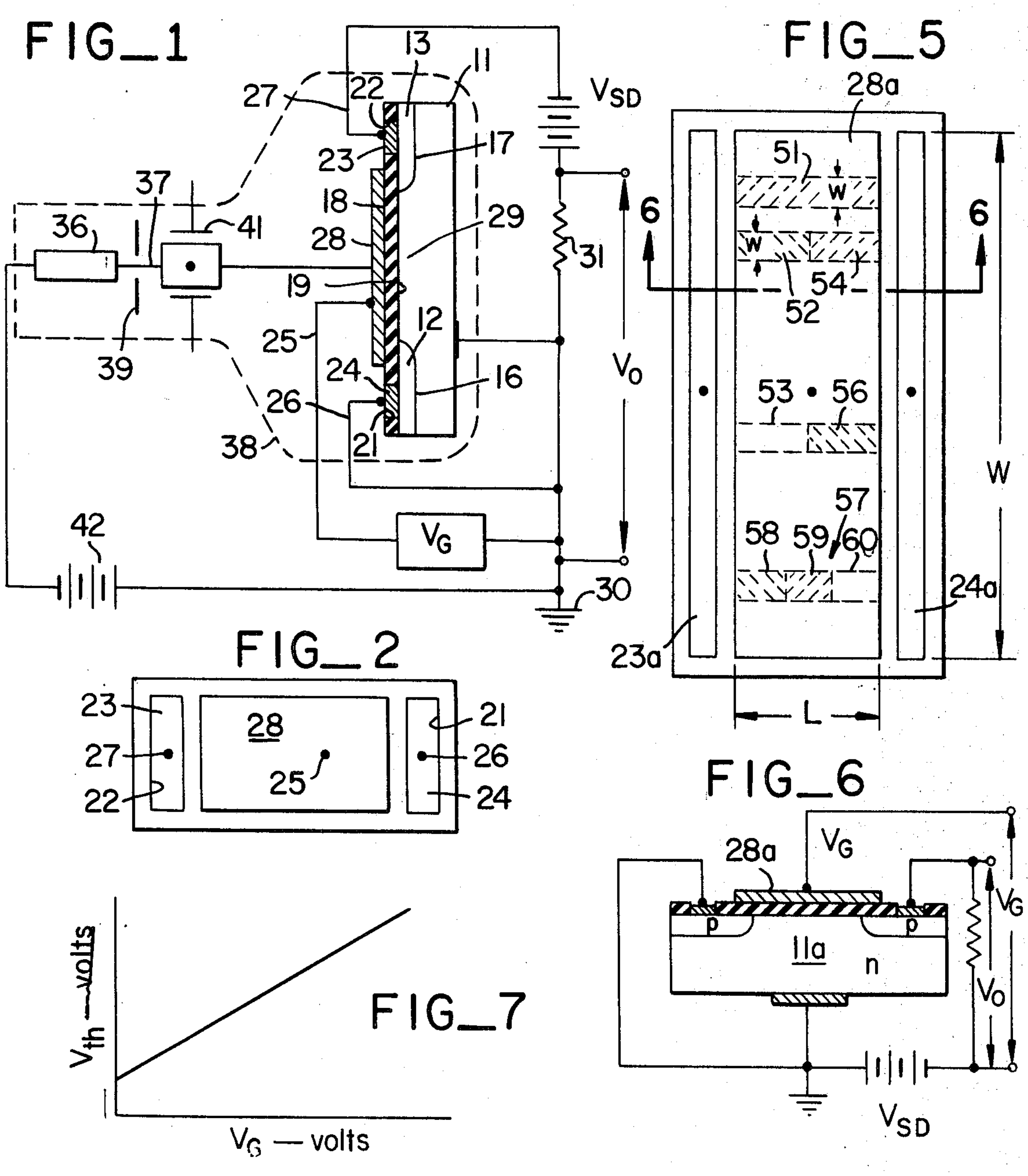
FIG. 1 is a schematic diagram showing a semiconductor memory element in section together with means for altering its characteristics in accordance with the invention.
FIG. 2 is a plan view of the semiconductor memory element shown in FIG. 1.
FIG. 5 is a plan view of a semiconductor memory element useful in conjunction with digital computers and serving as a storage and logic element.
FIG. 6 is a sectional view taken along the lines 6—6 of FIG. 5.
FIGS. 7 and 8 are curves which aid in the understanding of the invention.

The storage element, FIG. 1, includes a body of semiconductor material 11 of one conductivity type. Inset spaced source and drain regions 12 and 13 are formed in the body 11 as, for example, by diffusion. The inset regions 12 and 13 are of opposite conductivity type to form rectifying junctions 16 and 17, respectively. An oxide layer 18 overlies at least one surface of the body. The oxide may be formed during the diffusion process, or may be otherwise applied to the surface. In any event, the layer overlies the surface 19 to form an interface therewith. Windows or openings 21 and 22 are formed in the oxide layer and serve to receive metallic contacts 23 and 24 which form ohmic connection to the underlying regions 12 and 13, respectively. Terminal leads 26 and 27 may be bonded to the metallic contacts 23 and 24.

A metallic layer or film 28 is formed on the surface of the oxide layer as, for example, by evaporation of metal thereon. The metal layer 28 overlies region 29 between the source and drain connections and is in very close proximity to the junction or interface 19. It forms the gate of the transistor. Terminal lead 25 can be bonded to the metal layer 28.

The device is shown connected in a conventional circuit. A DC supply voltage source $V_{SD}$ is applied between the source and drain regions 12 and 13. The source region and the body 11 of the semiconductor device are both connected to the common or ground terminal 30. A load resistor 31 is connected in series with the DC supply voltage source $V_{SD}$. Output voltage $V_0$ is developed across the load resistor. Gate voltage is applied between the body 11 and the metallic gate contact 28 carried on the oxide layer. The gate voltage is illustrated by the box labelled $V_G$.

The device illustrated and described above is a typical field effect transistor known as an induced channel fiield effect transistor. The current flowing between the source and drain regions is substantially zero for zero gate voltage. When a negative voltage is applied to the gate, electrons are depleted from the channel region 29 adjacent the interface 19. Further increase in the amount of bias produces an accumulation of holes in the channel region 29. In other words, by making the bias or gate voltage more negative, the channel 29 goes from n-type, through intrinsic, to an inverted p-type layer. At this point conduction will occur between the source and drain regions 12 and 13 since the source, channel, and drain regions will be of the same conductivity type and be capable of conducting carriers. The amount of conduction of carriers, i.e., current, is dependent upon the magnitude of the gate voltage and can be varied or modulated in accordance therewith.

Figure 3A:
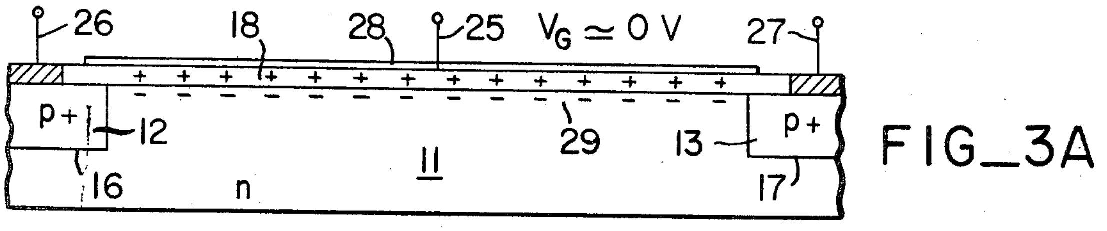
FIGS. 3A, 3B and 3C are schematic cross-sectional views of a semiconductor field effect device illustrating its operation.
Figure 3B:
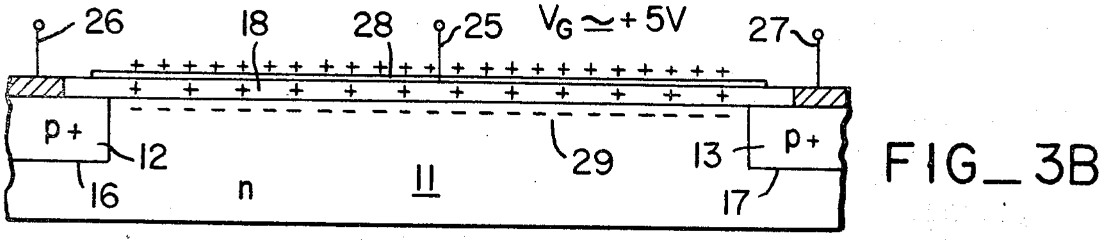
Figure 3C:
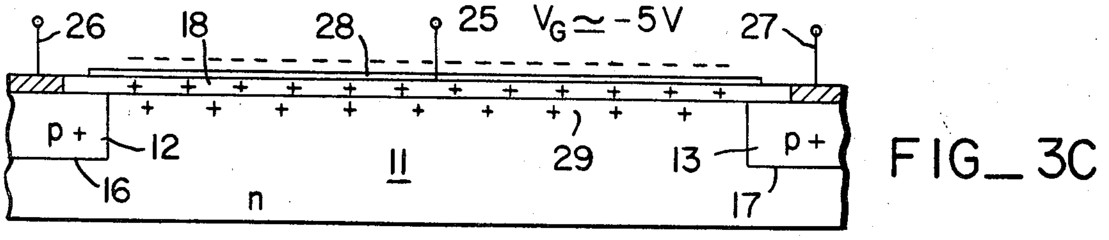

FIGS. 3A, 3B, and 3C illustrate operation of a device such as that shown in FIG. 1. They show a cross-section of a typical device and the charge distribution for three different gate voltages. To simplify the understanding of the invention, negative and positive charges are illustrated by the minus and plus signs appearing in the structure. The same reference numerals as used in FIGS. 1 and 2 have been used for like parts of FIG. 3.

FIG. 3A illustrates operation of the device with a gate voltage $V_G$ substantially equal to zero. It is noted that a few fixed positive charges exist in the insulating layer 18. These positive charges may induce mobile negative charges in the channel region 29. If a positive bias, for example, 5 volts, FIG. 3B, is applied between the gate contact 28 and the body 11, positive charge appears at the metallic gate contact 28 and, in turn, induces negative charges in the channel 29 underlying and immediately adjacent to the interface 19 between the insulating layer 18 and the body 11 of semiconductor material.

Finally, if a negative gate voltage $V_G$, for example, 5 volts, FIG. 3C, is applied, a negative charge will appear at the metallic gate contact which overcomes the fixed positive charge, FIG. 3A. For larger values of negative charge on the gate contact, mobile positive charges are induced in the channel region 29 which are free to move under the influence of an electric field parellel to the interface. More specifically, the latter case is the normal conduction mode of a field effect transistor and occurs when the drain voltage, $V_{SD}$, is made negative with respect to the source, in which case mobile holes flow from source to drain, through the channel 29. The number of mobile holes which flow can be modulated by the gate voltage; the more negative the gate voltage the greater the number of holes which are available for movement from source to drain. In other words, the surface conductance of the semiconductor body 11, at the channel 29, can be significantly changed by the application of an electric field normal to the metal contact overlying the oxide layer.

We have discovered that a stable charge may be fixed in the oxide layer by electron bombardment or other suitable means. In FIG. 1, there is illustrated an electron gun for bombarding or irradiating the oxide layer by projecting electrons through the metallic film into the underlying oxide layer and body of semiconductor material. The means illustrated include a source of electrons 36 which supplies electrons to the beam 37 which is directed to impinge upon the thin metallic gate layer 28. The electron gun is schematically shown as being enclosed in a vacuum envelope depicted by the dashed line 38.

The electron gun is shown including other electrodes such as a blanking electrode 39 for controllably gating the beam, that is, turning the same on and off, and deflection plates 41 which serve by application of suitable deflection voltages, to direct the beam to selected portions of the semiconductor device. Cathode 36 is maintained at a negative potential with respect to the semiconductor body by means of a voltage source 42.

In addition to the storing of stable fixed charge in the oxide layer 18 by electron beam bombardment, the present invention also provides for removal of this charge by again bombarding the device with suitable voltages applied; in other words, the process is reversible and this reversibility offers significant advantages to be described below.

Figure 4A:
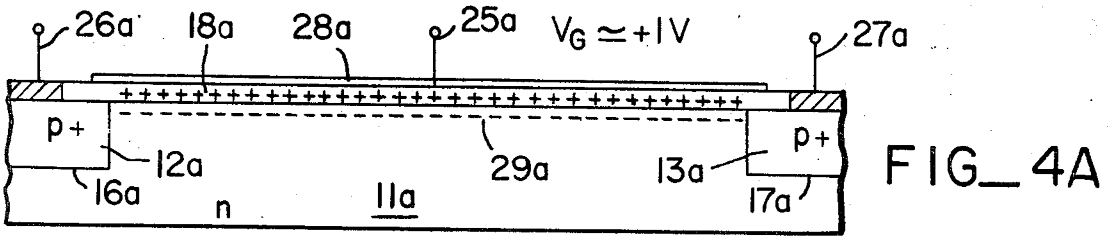
FIGS. 4A, 4B and 4C are schematic cross-sectional views of the storage element shown in FIG. 5 illustrating its operation in accordance with the present invention.
Figure 4B:
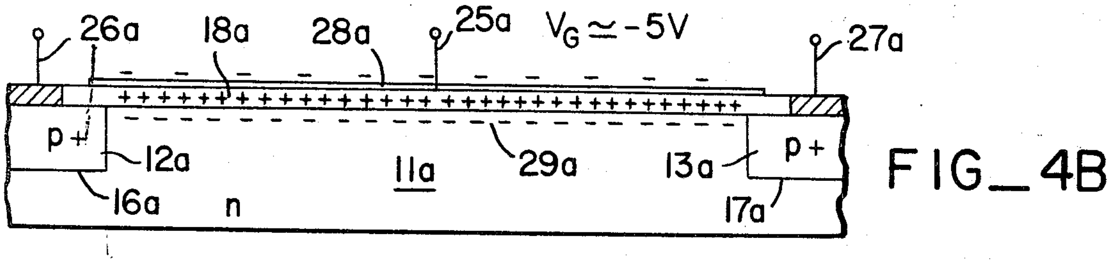

FIG. 4 illustrates the effects of bombardment of a device, such as that of FIG. 1, by electron beam 37. Bombardment of the gate contact **28*a*, insulating layer 18*a*, and body 11*a* by an electron beam of several thousand electron volts produces a dissipation of the beam energy as the material is penetrated. In accordance with electron beam induced conductivity (EBIC) theory, some of the energy dissipated by the beam causes hole electron pairs to be generated both in the insulating oxide layer 18*a* and the semiconductor body 11*a*. A positive potential applied to gate electrode 28*a* during bombardment attracts the mobile electrons in the insulating layer 18*a* leaving behind the less mobile positive charges in the form of a fixed positive charge in the insulating layer. This fixed positive charge, as shown in FIG. 4A, induces a correspondingly large mobile negative charge in channel 29*a* immediately beneath the oxide. The device in this condition is in a condition similar to that of FIG. 3B in that the channel region is highly negative of N+. Since conduction between drain and source is only achieved by inversion of channel layer 29*a* to P type conductivity, the effect of the fixed localized plus charges in the insulating layer is to make channel 29*a* non-conductive. If a negative gate voltage is applied which would cause conduction in an untreated device, conduction still does not occur because of the presence of the large fixed positive charge. This condition is shown in FIG. 4B where only some of the negative charges in the channel have been compensated by positive charges induced in the channel 29. Thus, a negative gate voltage of a much larger magnitude than normal is required before the device will start to conduct current between the source and drain. The curve of FIG. 7 illustrates the relationship between the positive gate voltage, $V_G$, used during electron bombardment of the device and the threshold of the subsequent minus gate voltage, $V_{th}$, required to cause conduction between the source and drain. With an increased, $+V_G$, during bombardment the threshold voltage is increased. This is logically explained in theory since greater positive voltage draws out more electrons during bombardment leaving a significantly greater number of fixed plus charges in the insulating layer 18**.

Figure 4C:
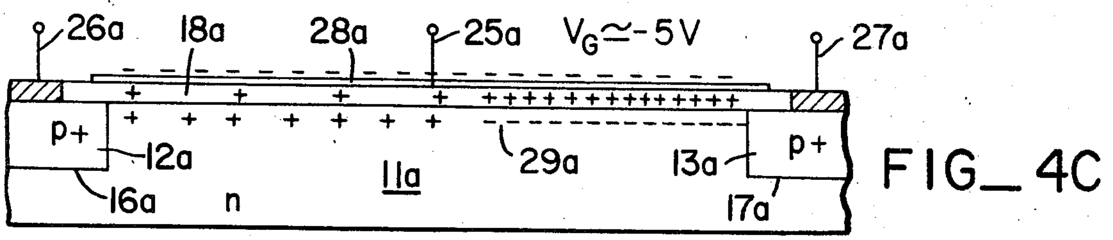

When it is desired to remove this fixed positive charge, the insulating layer may be again bombarded by the electron beam with a negative gate voltage, $V_G$, applied in order to provide a source of electrons for recombination with the less mobile fixed positive charges. The left hand portion of FIG. 4C illustrates removal of positive charges by bombardment of a portion of the device during application of a negative voltage to the gate terminal 25 to return the device to its normal state. Bombardment of only the left side of the gate of the device is shown.

The charge storage effect just described can be used to set the threshold voltage of metal oxide semiconductor transistors at the factory to a predetermined value since the induced charge has been observed to be permanent at temperatures exceeding 200° C. With the present use of this type of transistor in integrated circuits where a large number may be arrayed on a single wafer, the novel method of this invention can be valuable. The threshold voltage of the device can be independently set. The permanent storage effect may also be used to set the electric field at the insulator-semiconductor interface in these and other semiconductor devices and hence control their surface properties.

FIG. 5 shows a memory element similar to that of FIGS. 1 and 2 having elongated drain and source terminals. The device may be used for data storage and retrieval in a computer memory. The gate 28*a* is relatively wide and is represented as having a length L, and a width W.

Voltage source $V_G$ provides voltages of either a positive or negative polarity between the gate electrode 28*a* and the body 11*a*. Suitable source-drain voltage $V_{SD}$ is also applied. When conduction does occur between the source and drain, holes will flow from left to right parallel to gate 28*a*. If no fixed positive charge is placed in insulating layer 18 by bombardment, then with a negative gate voltage at the threshold level, conduction takes place. If only strip 51 having a width *w* has its corresponding channel region in a conductive state, the total current between the source and drain will be the ratio $w/W$. Thus, the magnitude of the current flowing between source and drain may be controlled by controlling the width of the conducting channel.

If it is desired to use the device of the present invention for storage of binary data, the following procedure is used: the entire gate area 28*a* is initially irradiated by electron beam 37 to place fixed positive charges throughout insulating layer 18*a* as illustrated in FIG. 4B. Alternatively, this over-all irradiation may be accomplished by other means, such as an X-ray source. After irradiation there is a condition of low or non-conductivity between the source 26*a* and drain 27*a*. Next, a binary "1" is stored in the left half of a conducting channel by scanning the area such as 52 with the electron beam with the gate voltage at a minus value. This forms a conductive path half-way across the channel area having a width *w* (for a cross-section, see FIG. 4C). As discussed above, the conductive path is formed since the negative gate voltage during the bombardment supplies electrons which recombine with the fixed positive charges previously stored in the entire channel. Where a binary zero is to be stored, no bombardment is used and a strip portion, for example, 53, remains in its non-conductive state.

Read out of the stored "1" and "0" bits is achieved by scanning the right side 54 of the channel area with electron beam 37 while a negative gate voltage is applied in order to cause the adjacent channel portion beneath the scanned area to become conductive. More specifically, area 54 is scanned in this manner, reversing the initial condition making the corresponding channel region conductive. Since the first portion 52 of the strip is already conductive, a current flows under the influence of the source to drain voltage producing an output voltage $V_o$. But because current is only conducted through this narrow strip portion having a width *w*, the voltage output will reflect this smaller current as compared to the maximum current where the entire channel is conducting.

Similarly when the electron beam 37 scans the area 56 adjacent to "0" area 53, no conduction will take place since the channel layer under area 53 is still non-conductive. Thus, a lack of voltage read out indicates a zero bit.

In the above manner binary information may be stored and read out. In addition, the invention has the ability to provide for a non-destructive read out in that the bit information remains in the left hand side of the scan area and is not affected by the reading out process. The entire storage may be returned to its original condition by, for example, subsequently bombarding areas 54 and 56 while a positive gate voltage is applied to place the respective channel portions again in a condition of low conductivity.

Logic functions may also be performed by the computer memory of the present invention; for example, an "AND" or coincidence gate function. This is illustrated by the strip 57 which includes the segments 58 and 59 and 60. For an output to occur, all three segments must have channel regions which are conductive. Thus, with areas 58 and 59 conductive, if area 60 is scanned and has a "1" input, the coincidence gate will produce an output. By providing more than three segments, a coincidence gate having several inputs is practicable.

In the same manner as discussed above, other logic functions may be formed by, for example, modifying the configuration or width of the different strips.

Thus, in summary, by controlling the polarity of the voltage source, $V_G$, the electron beam 37 may produce in the insulating layer 18 either fixed positive charges or eliminate such charges. Also, in the case where "0" bits are being stored in the memory and no change in charge is desired, the gate may be maintained at a positive potential or alternatively at the same time the blanking electrode 39 may blank the beam off.

In actual practice, gate area 28*a* may have a length, L, of, for example, from 10 to 50 microns or more, and a width, W, of, for example, 200 microns. The state of the electron beam art has progressed to a point where a beam diameter of $\frac{1}{10}$ micron can be obtained. However, scattering in the target limits the obtainable size of the charged storage area to a few microns square. Assuming the above dimensions, a bit storage capacity of approximately 20 bits is possible for the above device. In addition, a length dimension, L, of 50 microns allows the device to be used as a coincidence or "AND" gate having as many as 8 to 10 inputs. If special field effect devices are manufactured for computer storage elements, for example, having a greater elongation, more storage is, of course, feasible.

Figure 8:
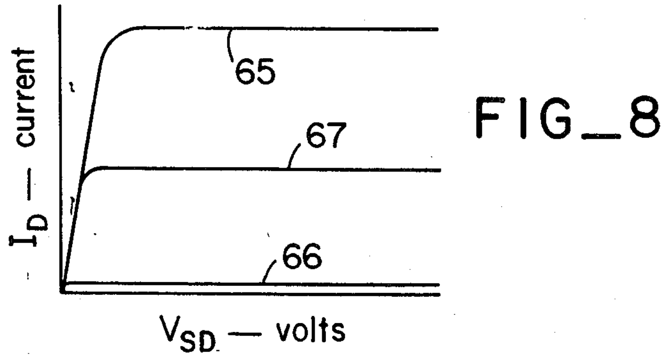

FIG. 8 illustrates typical drain current, $I_D$, versus $V_{SD}$ curves for the different conditions of device 11*a*. Curve 65 shows the conduction between source and drain when the entire area has been bombarded. Curve 66 shows the condition of low or non-conductivity where the entire area has been bombarded. Lastly, curve 67 illustrates a current produced by one of the information strips of width, *w*.

Although the preferred embodiment has utilized a P channel enhancement mode device, it should be emphasized that many other combinations may be used. For example, the initial state of the channel 29*a* was non-conductive which was achieved by bombardment. However, if an initial conductive condition is desired, this over-all bombardment would be eliminated and the "1" bit would then be a non-conductive portion and the "0" bit a conductive portion. Similarly instead of a P channel device, an N channel device could be used. Thin film devices may also be used in the same manner.

As described above, the computer memory provided by the present invention has reduced the number of metallic interconnections to the computer element to an absolute minimum. The drain terminal supplies power and the gate lead is necessary for storing or erasing information. Switching between logic elements is accomplished by the electron beam which is easily and rapidly deflected to the desired position. Power dissipation is also relatively low since power is only used when "1" bits are stored in the memory or when stored information is read out of the memory.

We claim:

1. A semiconductor device including a body of semiconductor material, an insulating layer carried on one surface of said body, said insulating layer having an equipotential surface formed on the exposed surface of said insulating layer; means including said equipotential surface for providing an electric field through said insulating layer, said insulating layer including fixed charges formed by bombarding said insulating layer with ionizing radiation to form positive and negative charge pairs while applying said electrical field through said insulating layer to remove one type of said charges to leave the other type disposed in said layer as a fixed charge.

2. A semiconductor device as in claim 1 in which a predetermined amount of fixed charge is disposed in said insulating layer, such charge determining the electric field at the semiconductor-insulating layer interface whereby the surface properties of said semiconductor are controlled.

3. A semiconductor device as in claim 1 where said equipotential surface, said insulating layer and said body of semiconductor material form a field effect transistor of the metal-oxide-semiconductor type.

4. A semiconductor device as in claim 3 where said charge sets the threshold voltage of said field effect transistor to a predetermined value.

5. A semiconductor memory element comprising a body of semiconductor material, spaced source and drain concetions on one surface of said body, an insulating layer carried on said one surface and extending at least to said connections, an equipotential surface formed on the exposed surface of said insulating layer, means for bombarding selected predetermined portions of said insulating layer with ionizing radiation, and means for simultaneously applying a voltage between said equipotential surface and said body.

6. A semiconductor memory element as in claim 5 where said insulating layer is of an elongated configuration having a width dimension relatively longer than its length dimension.

7. A semiconductor memory element as in claim 5 including means for selectively applying positive and negative potentials to said equipotential surface.

8. A semiconductor memory element as in claim 5 where said bombarding means includes an electron source forming an electron beam, means for blanking the electron beam, and means for deflecting such beam.

9. In a method of storing and removing charge in an insulating layer of a multilayer structure having an insulating layer with an equipotential surface area and a semiconductive channel layer sandwiched with said insulating layer, comprising the steps of providing a first electric field through said insulating layer by applying a voltage between said equipotential surface and said semiconductive layer, irradiating at least a portion of said surface area to store charge of a predetermined polarity in said insulating layer near said semiconductive layer, thereafter providing an electric field through said insulating layer of a direction opposite to said first electric field and selectively irradiationg at least a part of said previously irradiated area to remove said charge in such part.

10. In a method according to claim 9 wherein said second step the entire surface area is irradiated and thereafter only a part of said previously irradiated areas is irradiated.

11. In a method of data storage and retrieval which uses a multilayer structure as a storage member, such structure having an insulating layer with a first face with an equipotential surface and a second face forming an interface with a semiconductive layer, such layer having a channel region adjacent said interface, and means for sensing the conductivity between source and drain connections of said channel, said method comprising the steps of selectively controlling the charge in a predetermined portion of said channel between said source and drain connections by applying a voltage between said equipotential surface and said semiconductive layer to place such channel portion in a condition of either high or low conductivity, thereafter controlling the charge in the remainder of said channel between said spaced points to place such remainder in a condition of either high or low conductivity, and thereafter sensing the conductivity between said source and drain.

12. In a method according to claim 11 where a first half of such channel is placed in a condition of high or low conductivity and is representative of a binary "1" or "0" and the remaining half of such channel is placed in a conductive condition whereby a condition of high conductivity between said source and drain results if said first half is in a condition of high conductivity, and a condition of low conductivity between said source and drain results if said first half is in a condition of low conductivity.

13. In a method according to claim 11 where said channel or a strip of said channel consists of three or more portions in which said charge is controlled, and where each of said portions is placed in an identical condition whereby a coincidence condition results.

14. In a method as in claim 13 where said identical condition is one of high conductivity.

15. A method of storing data in a storage member having an insulating layer with a first face having an equipotential surface and a second face forming an interface with a semiconductor body comprising the steps of irradiating selected areas of the insulating layer with a high energy beam and applying a voltage between said equipotential surface and said semiconductor body to transfer charges between said equipotential surface and said selected areas during irradiation.

References Cited

UNITED STATES PATENTS 2,547,386 4/1951 Gray ______________ 340—173

TERRELL W. FEARS, Primary Examiner

U.S. Cl. X.R.

315—8.5; 328—123

Disclaimer 3,528,064.—*Thomas E. Everhart*, Berkeley, and *Noel C. MacDonald*, Albany, Calif. SEMICONDUCTOR MEMORY ELEMENT AND METHOD. Patent dated Sept. 8, 1970. Disclaimer filed Jan. 12, 1978, by the assignee, *The Regents of the University of California.*

Hereby enters this disclaimer to claims 1, 2, 3 and 4 of said patent.

[*Official Gazette March 21, 1978.*]